United States Patent [19]
Froger et al.

[11] Patent Number: 6,164,744
[45] Date of Patent: Dec. 26, 2000

[54] METHOD AND DEVICE FOR MONITORING THE OPERATIONAL STATE OF A RESERVOIR, FOR EXAMPLE AN INK RESERVOIR

[75] Inventors: Marie-Helene Froger, Chateaugiron; Pascal Coudray, La Chapelle des Fougeretz; Mickael Lorgeoux, Rennes, all of France

[73] Assignee: Canon Kabushiki Kaisha, Tokyo, Japan

[21] Appl. No.: 09/104,186

[22] Filed: Jun. 25, 1998

[30] Foreign Application Priority Data

Jun. 27, 1997 [FR] France ................................ 97 08132

[51] Int. Cl.$^7$ .................................................. B41J 2/195
[52] U.S. Cl. .................................................. 347/7
[58] Field of Search .................. 347/7, 19, 23, 347/86

[56] References Cited

U.S. PATENT DOCUMENTS

| | | | |
|---|---|---|---|
| 4,788,861 | 12/1988 | Lichti | 347/7 X |
| 5,162,817 | 11/1992 | Tajika et al. | 347/7 |
| 5,500,657 | 3/1996 | Yauchi et al. | 347/9 |
| 5,682,184 | 10/1997 | Stephany et al. | 347/7 |
| 5,724,076 | 3/1998 | Ishida | 347/7 |
| 5,774,136 | 6/1998 | Barbehenn et al. | 347/7 |
| 5,788,388 | 8/1998 | Cowger et al. | 347/7 X |

FOREIGN PATENT DOCUMENTS

| | | |
|---|---|---|
| 338400 | 10/1989 | European Pat. Off. . |
| 4027657 | 11/1991 | Germany . |
| 61-265531 | 11/1986 | Japan . |

*Primary Examiner*—William J. Royer
*Attorney, Agent, or Firm*—Fitzpatrick, Cella, Harper & Scinto

[57] ABSTRACT

In order to monitor the state of a reservoir made of electrically insulating material containing a normally electrically conductive product, ink for example, the free end of the outlet channel of the reservoir is connected to a predetermined potential and two measurement procedures are defined, the first of which results in a first measurement signal, a characteristic of which varies mainly with the quantity of product contained in the storage cavity of the reservoir, and the second of which results in a second measurement signal, a characteristic of which varies mainly with the electrical conductivity of the channel between its ends.

During the measurements, an abnormality correction procedure (or a simple alarm procedure) is triggered when the characteristic of the second measurement signal indicates a low electrical conductivity of the channel (absence of product) whilst the characteristic of the first signal indicates that there is still product in the storage cavity.

30 Claims, 9 Drawing Sheets

METHOD AND DEVICE FOR MONITORING THE OPERATIONAL STATE OF A RESERVOIR, FOR EXAMPLE AN INK RESERVOIR

The present invention relates to the monitoring of the operational state of a container; it concerns notably the detection of the presence of the reservoir (if this is useful) and/or of the need to clean the print head forming part of a printing device.

In printing devices using for example ink-jet printing technology, there exists a few solutions for cleaning the print heads of the cartridges on the one hand and for detecting the presence of these same cartridges on the other hand.

In ink-jet printers, the print heads need to be cleaned regularly. This is because there is sometimes no ink in the print head and in the duct connecting the container to the print head; sometimes also the ink dries and obstructs the print head. In order to ensure constant and optimum print quality, it is necessary to carry out cleaning. The cleaning sequence consists of effecting suction at the print head in order to eliminate the dry ink and/or to draw the ink back in the duct or channel connecting the container and the print head. Thus current printing devices conventionally carry out cleaning on powering up if the power supply cable has been disconnected, after a cartridge or a container forming part of it has been replaced, a certain length of time (for example 72 hours) after the last cleaning if the printer remains powered up and/or after the printing of a given number of dots. In addition, a key and/or software accompanying the printer enable the user to carry out manual cleaning if he wishes.

In addition, in these printing devices, systems make it possible to detect the installation or non-installation of a cartridge. In these devices, the cartridge is placed on a support, the carriage. When the cartridge is positioned, there is contact between the printed circuit of the print head and a connector located on the carriage. This connector enables the print head to be supplied electrically. Consequently, by checking the potential of certain connection points (the anode of a diode, a resistor for example), it is possible to state whether or not a print head and therefore a cartridge is in position.

These methods have a certain number of failings.

Concerning the cleaning of the print head, the current solutions consist of carrying out regular and systematic cleaning: after the printing of a given number of dots, etc. Thus a cleaning of the head is not always justified, since cleaning may be carried out when the print quality is optimum; these cleanings are therefore a waste of ink and time since a cleaning sequence lasts several tens of seconds (22 seconds for example for a printer of the BJ4100 type). Conversely, cleaning of the print head may be necessary between two programmed cleaning sequences. In this case, the print quality drops and it is for the user to decide to carry out a cleaning sequence. This implies monitoring by the user, which is obviously not desirable.

Concerning the detection of ink cartridges, the current solution consists in fact of detecting the print head. Where the print head and the container are integral, this solution is entirely viable. However, there are cartridges (such as colour printing cartridges) which contain the print head and exchangeable containers. In this case, it is of course always possible to detect the print head but the known solutions do not make it possible to know whether or not the containers are in place. Thus the user may initiate printing and not be aware of the problem until the sheet comes out.

The same drawbacks are found with regard to any image forming device, whether it uses ink or any other marking product, on paper or on any other medium, textile for example.

The object of the invention is to mitigate the aforementioned drawbacks. More generally the invention aims to afford, in a simple and reliable fashion, monitoring of the operational state of a reservoir containing a product which is to flow out of a storage cavity through an outlet channel, so as only wittingly to trigger a maintenance procedure such as a channel cleaning procedure. In general terms, this procedure to be triggered in the event of an abnormality may also correspond to a correction of the abnormality, or even simply to the emission of an alarm signal. As a complement to this (but this may, as a variant, become the main object) this monitoring of the operational state of the container may include the detection of the presence of the container at its service position, or of its correct positioning.

The invention relates to cases where the product is normally electrically conductive and where the container, including the outlet channel, is made of electrically insulating material (these assumptions are complied with in the case of a certain number of printing ink cartridges), and is based on the assumption that it is then reasonable to consider:

that no maintenance operation such as a cleaning procedure is necessary as long as there is electrical continuity along the outlet channel, that, on the other hand, the cases requiring such a maintenance procedure correspond to situations where this electrical continuity is interrupted, either that the product has dried (it is then in practice in the state of more or less isolated particles) or that there is no more product in the channel. In the latter case, it should however be noted that a maintenance operation is of use only if there is still product available in the container.

The invention consequently proposes a method of monitoring the state of a reservoir made of electrically insulating material containing a product which is normally electrically conductive and having a product storage cavity and a product outlet channel communicating through one end with this storage cavity, according to which:

the other end of the channel is connected to a predetermined potential;

a first measurement procedure is defined, consisting of applying a first electrical signal to this storage cavity and detecting a first measurement signal, this first electrical signal being chosen so that this first measurement signal has a first characteristic varying mainly with the quantity of product contained in this storage cavity, and there is chosen, for this first characteristic, a first range of values corresponding to quantities of product greater than a minimum given quantity of the said product;

a second procedure is defined, consisting of applying to this storage area a second electrical signal different from the first electrical signal and detecting a second measurement signal, this second electrical signal being chosen so that this second measurement signal has a second characteristic varying mainly with the electrical conductivity of the channel between its ends, and there is chosen, for this second characteristic, a second range of values corresponding to conductivities greater than a minimum given electrical conductivity of this channel; and at least one monitoring cycle is executed, including the following steps:

the first procedure is triggered and a first item of information representing the instantaneous value of the first characteristic is captured;

the second procedure is triggered and a second item of information representing the instantaneous value of the second characteristic is captured;

the first item of information is compared with the first range of values of the first characteristic and the second item of information is compared with the second range of values of the second characteristic; and an abnormality procedure is triggered when the first item of information is within the first range of values and the second item of information is outside the second range of values.

This abnormality procedure (that is to say this procedure provided for in the event of abnormality) is preferably a procedure consisting of causing a forced flow of product through the channel. In practice this forced flow will have the effect of cleaning the operating element to which the outlet channel is connected.

Preferably, the first electrical signal has a first frequency, the first characteristic is the amplitude of the voltage of the first measurement signal, this first frequency being chosen so that the amplitude of this voltage varies substantially with the quantity of product contained in the storage cavity. In this way it is possible to derive an item of information representing the quantity of product contained in the container, from the behaviour of a capacitive arrangement including the container.

Also preferably, the second electrical signal has a second frequency, the second characteristic is the amplitude of the voltage of the second measurement signal, this second frequency being chosen so that the amplitude of this voltage is substantially independent of the quantity of product contained in the storage cavity. Use is therefore made of the fact that the behaviour of a capacitive arrangement varies according to whether or not one of its points is connected to a predetermined potential.

According to a particularly advantageous provision of the invention, the first and second procedures consist of applying the first and second electrical signals and detecting the first and second measurement signals in elements which can be separate from the storage cavity, a third range is chosen, formed by values of the first characteristic corresponding to the presence of this storage cavity with a quantity of product which may be zero, and a second abnormality procedure is triggered when the first item of information is outside this third range of values. Use is thus made of information aimed at detecting the triggering conditions for a first procedure for monitoring the correct positioning, or even the presence, of the cavity. It is therefore possible, where applicable, to activate the display of an error message.

Naturally, when the container has several cavities, the aforementioned items of information are preferably captured for each of these cavities, so as to be able to monitor the operational state of each of these cavities (advisability of a maintenance procedure, or of the sending of an error message). For obvious reasons of simplicity, it is advantageous to apply the same electrical excitation signals to each cavity.

The predetermined potential to which the other end of the channel is connected is preferably that of earth, which is easily available.

The monitoring cycle can be repeated as often as desired, for example after each phase of use of the operating element, which corresponds to the formation of an image in the case of an image formation device or to the printing of a page in the case of a printing system.

The invention also proposes a device adapted to implement the method, that is to say a device for monitoring the operational state of a reservoir made of electrically insulating material containing a product which is normally electrically conductive and having at least one storage cavity and a product outlet channel communicating through one end with this storage cavity, this device having:

connection means for connecting the other end of the channel to a predetermined potential;

first means for applying different first and second electrical signals to the storage cavity, and second means for detecting first and second measurement signals in response to these first and second electrical signals, this first electrical signal being such that the first measurement signal has a first characteristic varying mainly with the quantity of product contained in the storage cavity, and this second electrical signal being such that the second measurement signal has a second characteristic varying mainly with the electrical conductivity of the channel between its ends;

third means for storing a first range of values which can be taken by the first characteristic for quantities of product greater than a given minimum quantity of the said product in the storage cavity, and a second range of values which can be taken by the second characteristic for conductivities greater than a given minimum conductivity of this channel;

processing means connected to the first, second and third means for triggering a first procedure consisting of applying the first electrical signal and detecting the first measurement signal, and capturing a first item of information representing the instantaneous value of the first characteristic;

triggering a second procedure consisting of applying the second electrical signal and detecting the second measurement signal, and capturing a second item of information representing the instantaneous value of the second characteristic;

comparing the first item of information with the first range of values of the first characteristic and comparing the second item of information with the second range of values of the second characteristic; and triggering an abnormality procedure when the first item of information is inside the first range of values and the second item of information is outside the second range of values.

This device is advantageously provided with the means necessary for implementing the advantageous particularities of the invention as indicated above.

Preferably, the two electrical excitation signals are applied to common elements, which is both simple and compact.

These elements are advantageously fixed with respect to a support in relation to which one or more cavities are removable.

The invention also concerns per se a processing device adapted to be incorporated in a monitoring device of the aforementioned type.

It also concerns a product supply device having in combination a monitoring device of the aforementioned type and the product container whose operational state it is sought to monitor.

It finally concerns, in particular:

an image forming device whether or not having a marking product container and a monitoring device of the aforementioned type, a printing appliance having a device for monitoring the operational state of an ink container with one or more cavities, whether or not in combination with such a container, an office machine including such a printing appliance, and an office signal processing unit adapted to cooperate, within such a printing appliance, with a container and signal application and detection means of the aforementioned type.

Objects, characteristics and advantages of the invention will emerge from the following description, given by way of non-limitative example, with regard to the accompanying drawings in which.

Figure 1:
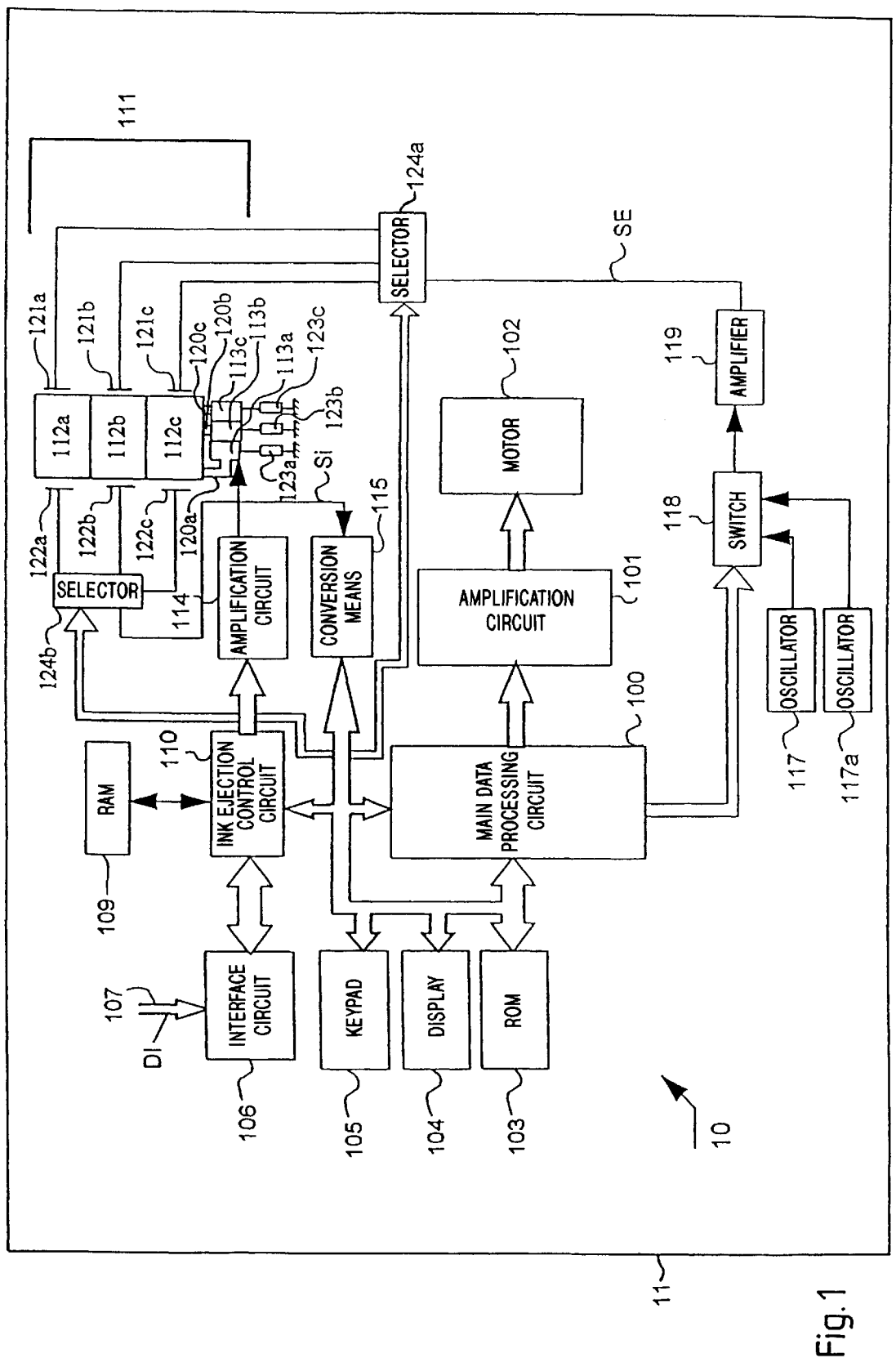
FIG. 1 is a diagram of a printing device according to the invention.
Figure 2:
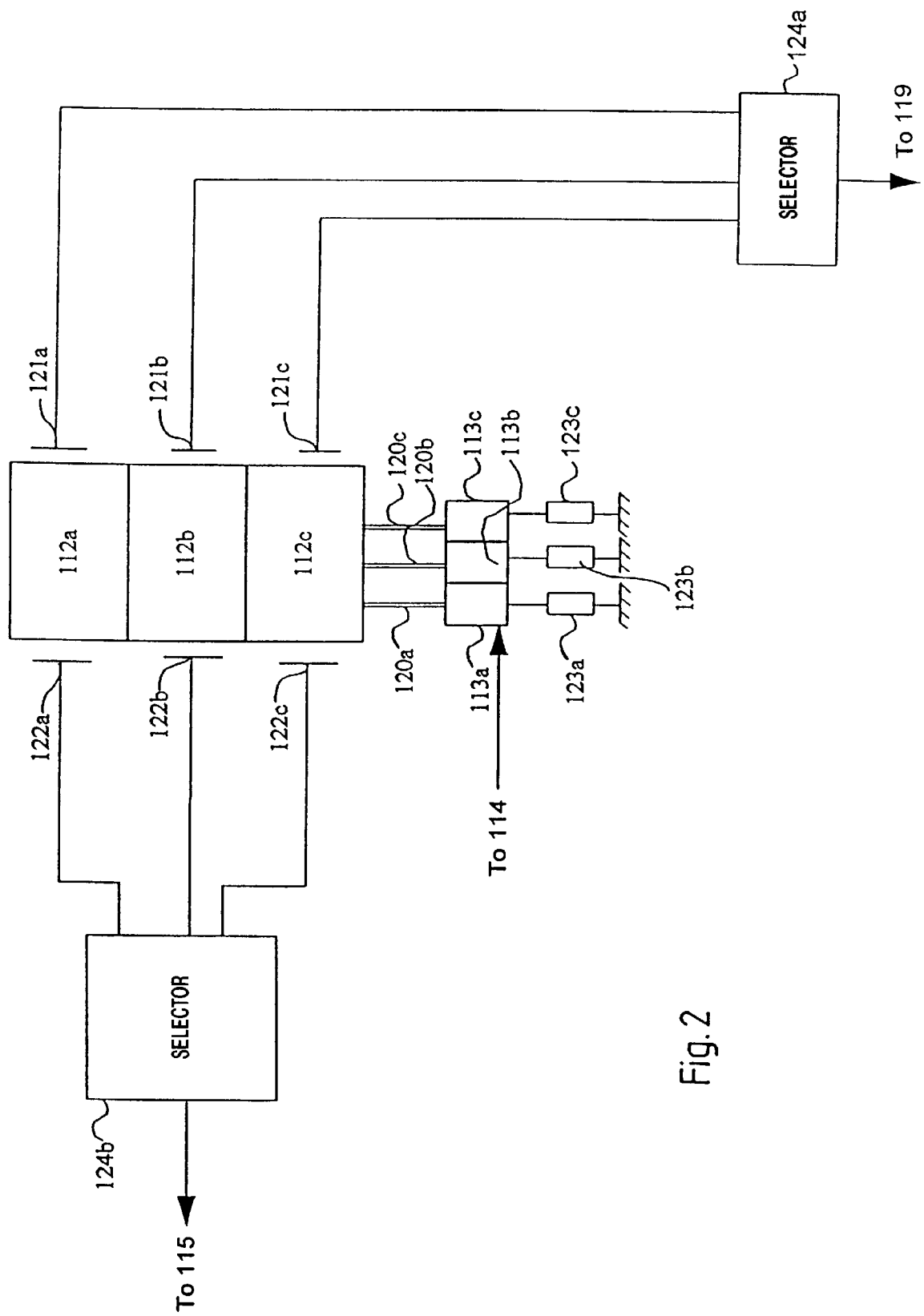
FIG. 2 is an enlarged diagram of the mounting of the container of FIG. 1 within this printing device.

FIG. 1 depicts overall an image transfer device 10, for example included in a printer 11 which receives data to be printed DI via a parallel input/output port 107 connected to an interface circuit 106. The circuit 106 is connected to an ink ejection control circuit 110 which controls an ink cartridge 111 via an amplification circuit 114.

The ink cartridge comprises essentially an exchangeable container with three cavities or compartments 112a, 112b, 112c, ducts 120a, 120b, 12c connecting the container to print heads 113a, 113b, 113c. This cartridge is mounted on a reciprocating translatable carriage actuated by a motor 102.

The printer also has a main data processing circuit 100, associated with a read only memory 103 and a random access memory 109. The read only memory 103 contains the operating programs of the main data processing circuit 100, whilst the random access memory 109, also associated with the ink ejection control circuit 110, temporarily stores the data DI received via the interface circuit 106 as well as the data processed by the main data processing circuit 100.

The main data processing circuit 100 is connected to a display 104, on which the main data processing circuit 100 controls the display of messages representing the functioning of the printer. The main data processing circuit 100 is connected to a keypad 105, having at least one switch, by means of which the user can transmit operating commands to the printer.

The main data processing circuit 100 is also connected to the motor 102 by means of an amplification circuit 101. The motor 102 moves the carriage which carries the ink cartridge 111. The motor 102 is for example a stepping motor. The printer previously described is conventional and well known to persons skilled in the art. It will therefore not be detailed any further.

The container is made from insulating plastic and each ink is electrically conductive.

According to the invention, the printer has two metallic plates 121i and 122i for each compartment 112i (i designating either a, or b, or c), fixed outside of the container thus forming a capacitor for each compartment.

The ducts for connecting each compartment to the print heads are used as electrical switches between the compartments and the equivalent impedances between the print heads and a given potential which is preferably earth. This is because the ink behaves as an electrical conductor between each compartment of the container and the impedances of the print heads.

For each compartment, the invention consists of successively generating two sinusoidal signals with different frequencies on one of the plates and measuring the two voltages corresponding to each frequency on the second plate. The two frequencies are chosen so that these two voltages respectively represent the presence of ink in the duct connecting the compartment and the corresponding print head and the quantity of ink contained in the compartment. These two voltages also represent the presence of the exchangeable containers.

The printer comprises selectors 124a and 124b for respectively switching the metallic plates or elements 121a, 121b or 121c to the amplifier 119, or the metallic plates or elements 122a, 122b or 122c to a conversion means 115. When it is wished to make a measurement for the compartment i, the selector 124a connects the alternating signal supplied by oscillators 117 and 117a, of different frequencies, to the corresponding metallic plate 121i; the selector 124b connects the corresponding metallic plate 122i to the conversion means 115.

The conversion means 115 is designed to convert the electrical signal between the plate 122i and earth into a signal representing the ink level in each compartment 112i and the presence of ink in the duct 120i connecting or not the ink contained in the compartment 112i to earth via on impedance 123i existing between the ink in the print head and the earth.

The main data processing circuit 100 controls the switch 118, selector 124a and selector 124b. The switch 118 makes it possible to select the alternating signal of the oscillator 117 or 117a and to direct it successively towards each of the plates 121a, 121b and 121c via the amplifier 119 and the selector or switch 124a. The element 122i is connected via the selector 124b to the conversion means 115 which in response supplies digital signals N to the main data processing circuit 100.

Figure 3:
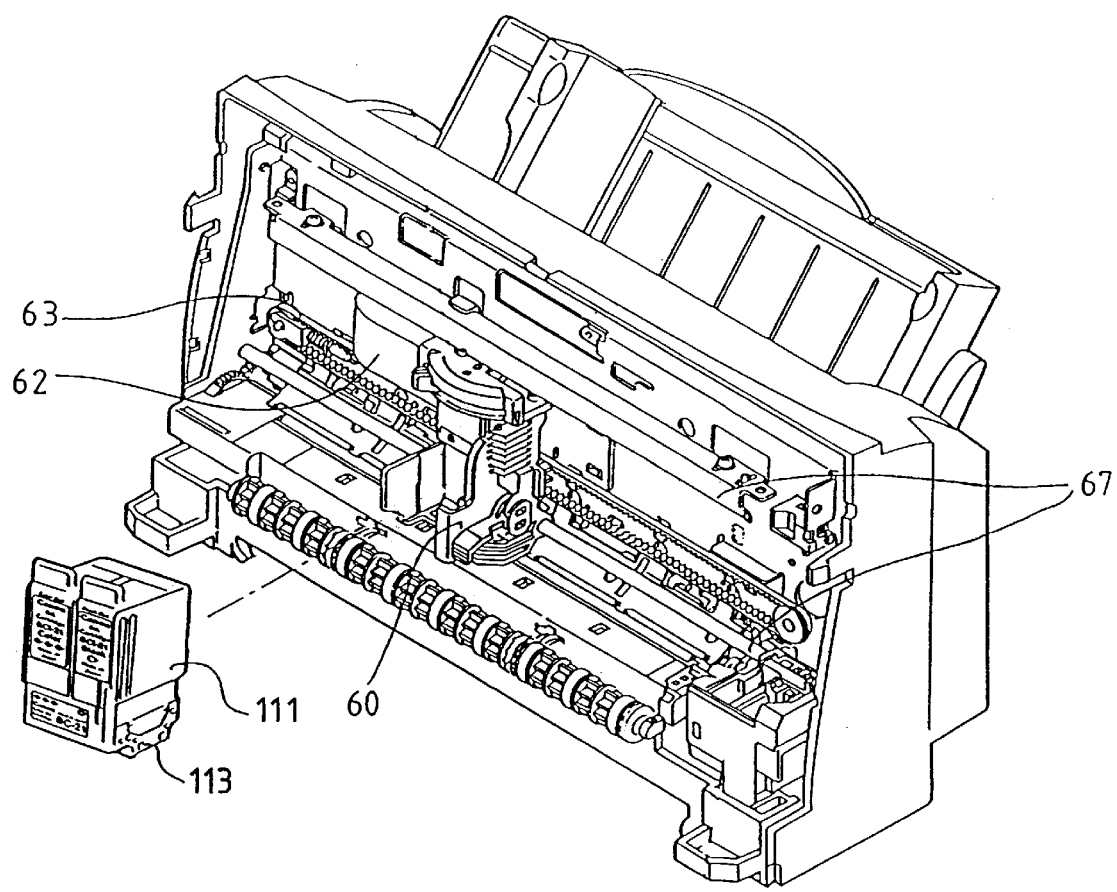
FIG. 3 is a perspective view of a printing device according to FIG. 1.

As is clear in FIG. 3, the printing device conventionally comprises a carriage 60 for carrying the ink cartridge 111. The carriage is driven in a reciprocating movement on a movement path formed by guide rails 67. The motor 102 drives the carriage 60 by means of a belt device 63.

The movement path of the print head 113 is parallel to a line on a printing medium, not shown, such as a sheet of paper. A flexible cable 62 connects the amplification circuit 114 to the ink cartridge 111, the amplifier 119 to the metallic elements 121i, via the selector 124a, and the metallic elements 122i to the conversion means 115, via the selector 124b.

Figure 4:
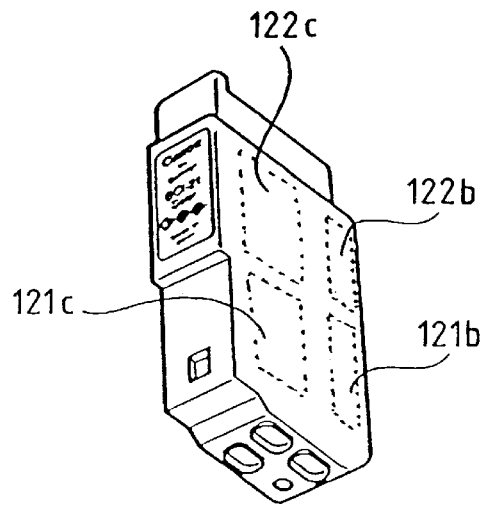
FIG. 4 is a perspective view of an ink container with three compartments.

FIG. 4 depicts an exchangeable container with three compartments. These compartments conventionally contain yellow, magenta and cyan inks. The position where metallic plates 121c, 122c, 121b and 122b are designed to come, corresponding to the arrangement of the compartments in the container, can be seen in dotted lines. This container is designed to be installed in a housing in the cartridge 111, depicted by FIG. 5.

Figure 5:
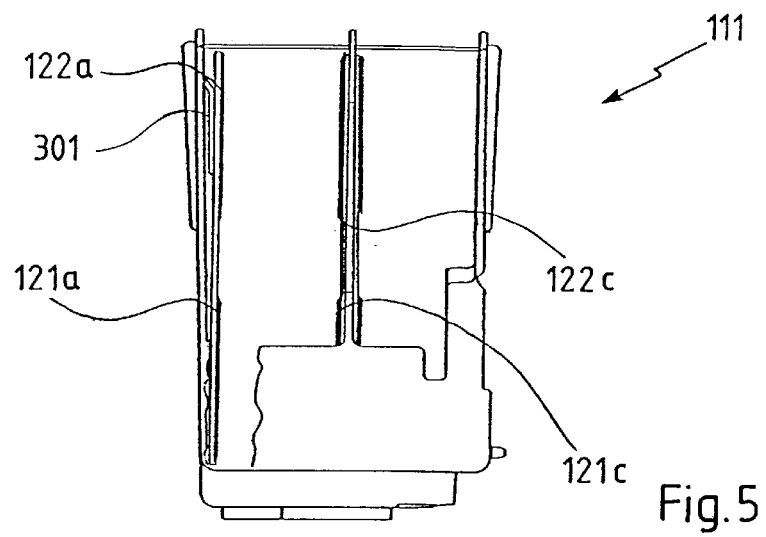
FIG. 5 is a front view, partly exploded, of a support adapted to receive the container of FIG. 4.

FIG. 5 depicts a cartridge 111 and the arrangement of the metallic plates 121a, 122a, 121c and 122c in contact with the walls of the previously described container. An element 301 can be seen, serving as a spring for exerting a pressure on the metallic plates 121a, 122a, 121b and 122b on the walls of the container.

Figure 6:
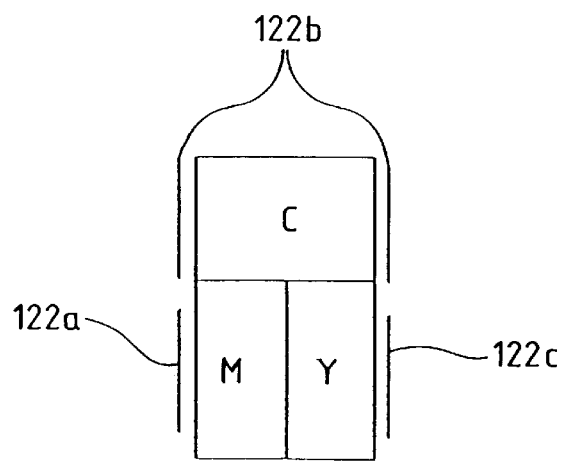
FIG. 6 is a schematic plan view of the container of FIG. 4 in the support of FIG. 5.

FIG. 6 is a plan view of the exchangeable container; it indicates the configuration of the three compartments and the arrangement of the metallic plates 122b, 122a and 122c.

Figure 7:
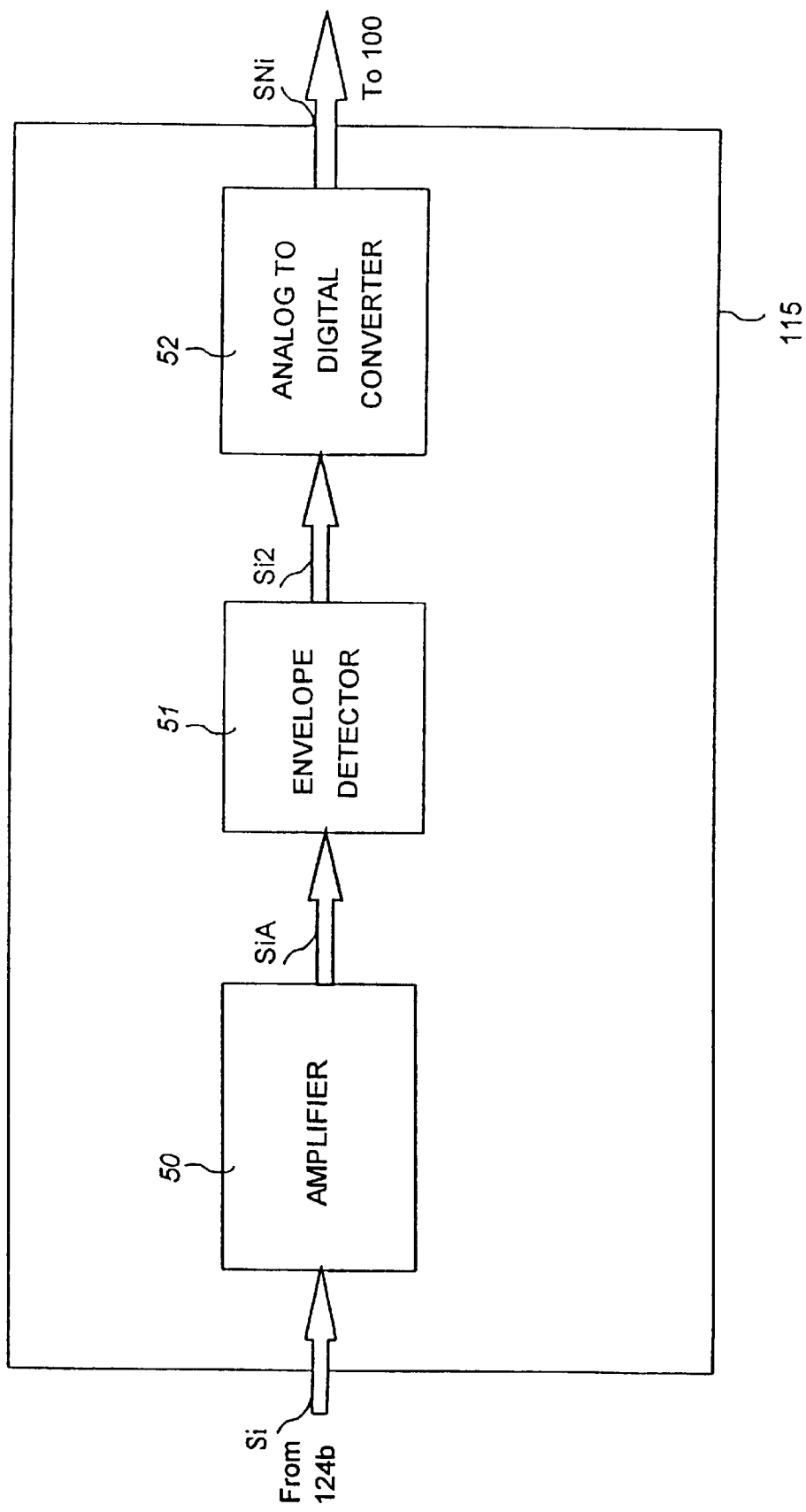
FIG. 7 is a block diagram of the measurement signal detection and processing device forming part of the device of FIG. 1.

The conversion means 115 of FIG. 7 extracts the amplitude of the signals received by the metallic plates 122i in response to an excitation signal SE supplied by one of the oscillators 117 or 117a. The conversion means 115 comprises an amplifier 50 with an input impedance of 1 MΩ connected to an envelope detector 51. The envelope detector 51 is connected to an analogue to digital converter 52 connected to the main data processing circuit 100.

The metallic plate 122i supplies through selector 124b the electrical signal Si to the amplifier 50, which amplifies the electrical signal Si current-wise and voltage-wise, so as to facilitate the following processing. The electrical signal Si is a function of the capacitance detected between the two metallic plates.

The amplifier 50 supplies the amplified signal SiA to the envelope detector 51, which determines the peak value of the amplified signal.

The signal Si2 output from the envelope detector 51 is supplied to the converter 52, which converts the analogue signal Si2 into a digital signal Sni in order to transmit it to the main data processing circuit 100. A mapping table TC stored in memory 103 maps a quantity of ink or the presence of ink in the connecting duct to the digital signal Sni supplied by the converter 52.

Figure 8:
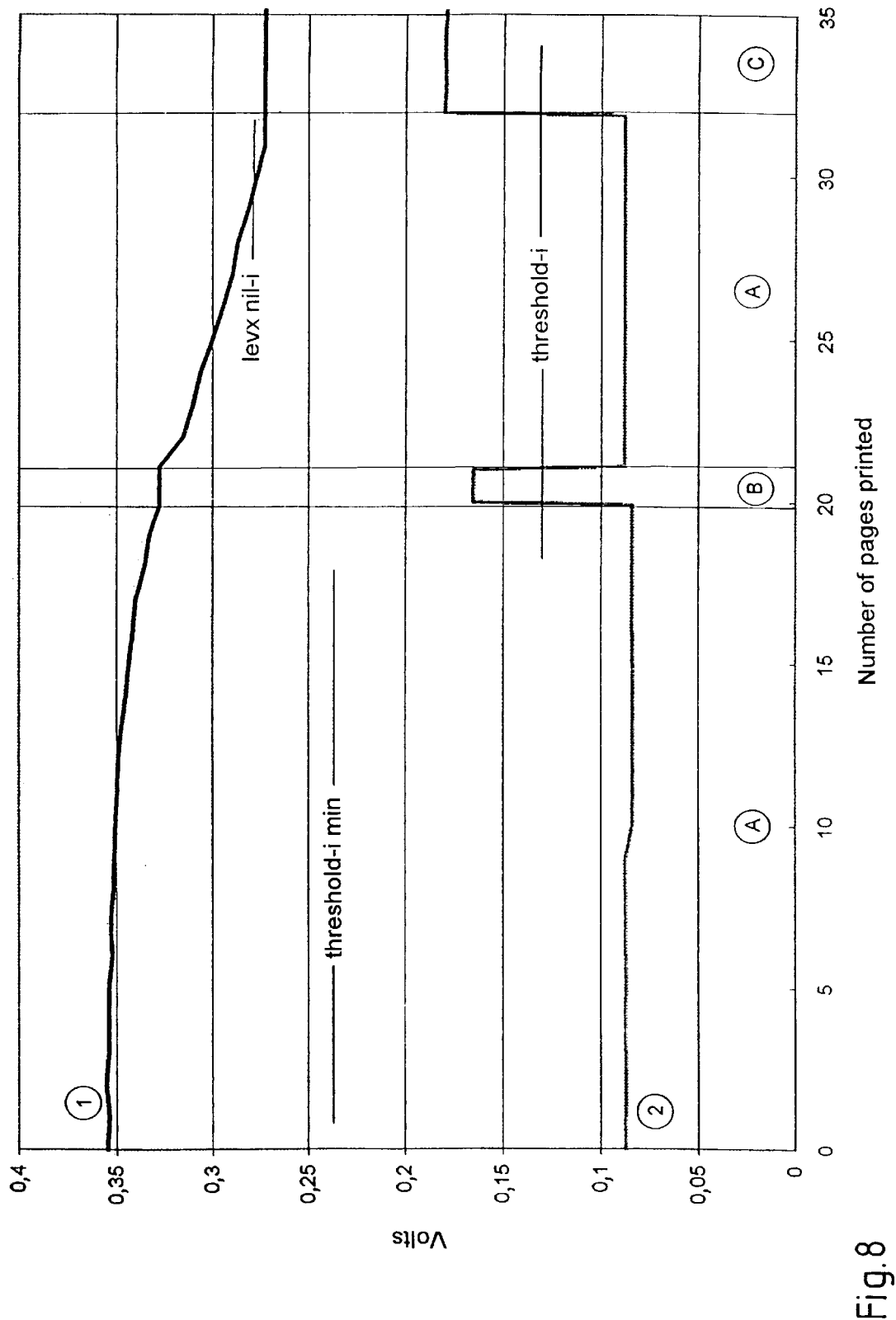
FIG. 8 is an example of a graph showing the changes in the two items of information corresponding to a cavity, according to the number of pages printed.

FIG. 8 depicts an example of a result obtained by emptying one of the compartments of the exchangeable container and generating and measuring the alternating signals only on the plates of the compartment.

On the X-axis the number of printed pages is shown. The Y-axis shows, in volts, the voltage of the electrical signal Si at the metallic plate 122i.

The two curves depicted here correspond to signals of different frequencies. The first frequency is chosen so that the output signal varies mainly with the quantity of ink contained in the compartment whilst the second frequency is chosen so that the output signal is substantially insensitive to this quantity of ink and in contrast reacts to the state of the electrical connection established by the ink in the channel or duct between the compartment (or cavity) and earth (or at least the print head).

The curve 1 is obtained by using the oscillator 117, whose frequency is around 5 MHz. At this frequency, the impedance of the print head is high, which means that the influence of the variation in ink level on the signal Si is great. The curve 1 therefore represents the level of ink in the compartment.

The curve 2 is obtained by using an oscillator 117a whose frequency is around 10 kHz. At this frequency, the impedance of the print head is low, which tends to reduce the influence of the variation in ink level on the signal Si. In contrast, when there is a lack of ink in the duct connecting the compartment (or cavity) to the print head, the signal Si increases abruptly. The curve 2 therefore represents the presence of ink in the connecting duct.

Curves 1 and 2 are divided into three parts a, b and c. Part a is a region where printing takes place normally: curve 1 indicates that the level decreases from page to page and curve 2 indicates that there is still ink in the connecting duct. Part b is a region where the printing device is no longer printing. Curve 1 indicates that the level is stagnating, even if ink is still present in the compartment. Curve 2 has increased abruptly, indicating that there is a lack of ink in the connecting duct. This region b therefore indicates the need for a cleaning of the print head. Part c is a region where there is no longer any ink, neither in the compartment nor in the connecting duct. In addition, the presence of thresholds threshold-i, threshold-imin and levx nil−1 can be noted, relating respectively to the presence of ink in the connecting duct, to the installation of the exchangeable container and finally to the absence of ink in the compartment.

Figure 9:
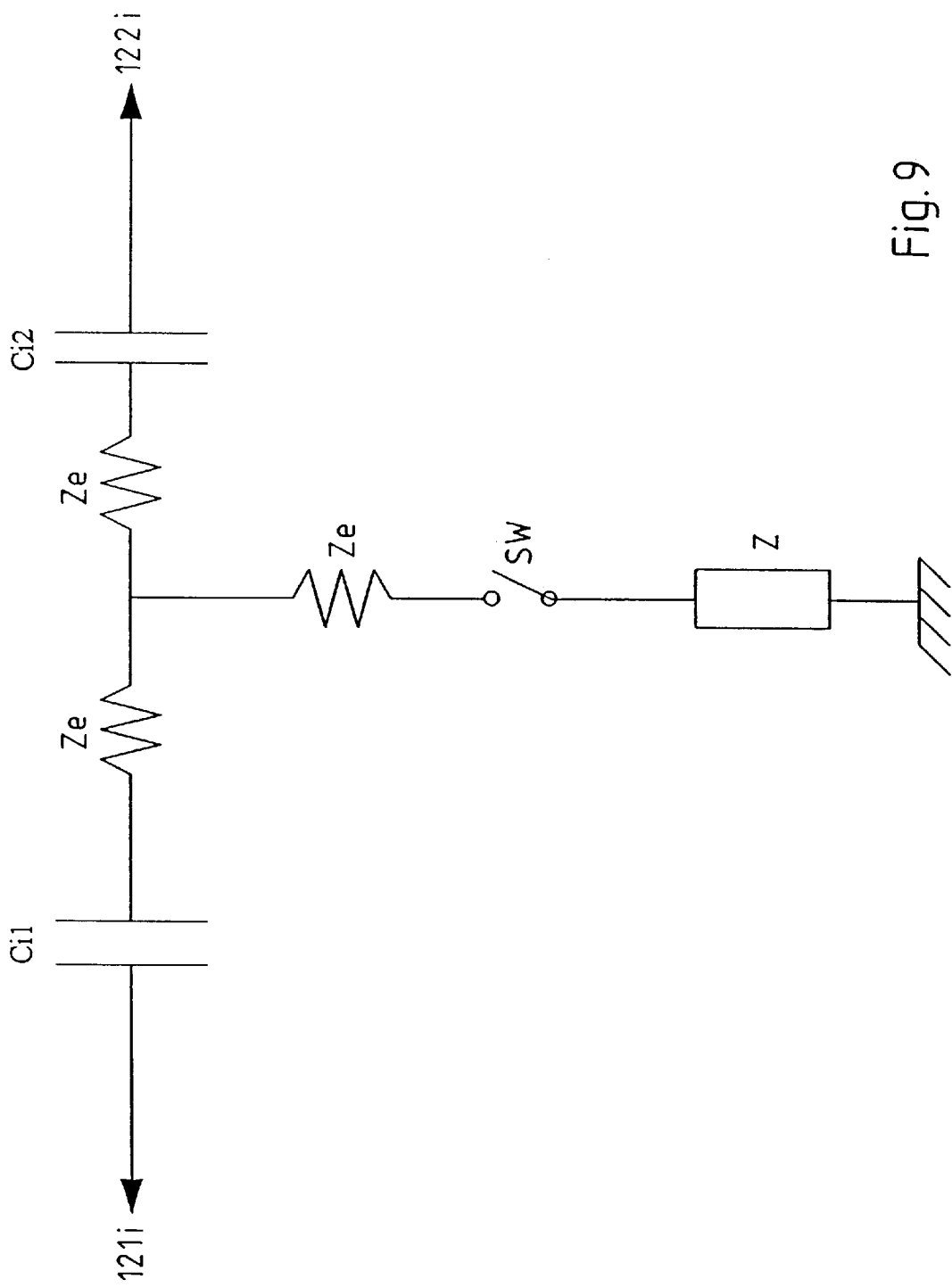
FIG. 9 is an electrical diagram equivalent to the container (including its product outlet channel) within the monitoring device.

FIG. 9 depicts the electrical diagram of the phenomenon where:

Ci1: represents the capacitance formed by the metallic plate 121i, the wall of the compartment 112i and the ink.

Ze: represents the equivalent impedance of the ink, which can be both resistive and capacitive.

Ci2: represents the capacitance formed by the metallic plate 122i, the wall of the compartment 112i and the ink.

Sw: represents the ink present or absent in the duct 120i. This is represented in the form of a switch, which is open or closed according to the absence or presence of ink.

Z: represents the impedance 123i between the ink contained in the print head and the system earth.

When the oscillator 117 is connected to the plate 121i and when the quantity of ink decreases in the compartment 112i, the capacitances Ci1 and Ci2 decrease, the impedance Ze increases substantially and the voltage at 122i decreases. When the oscillator 117a is connected to the plate 121i, and when there is a lack of ink in the duct 120i, the latter serves as a switch, then causing an abrupt rise in the electrical signal on the plate 122i.

Figure 10A:
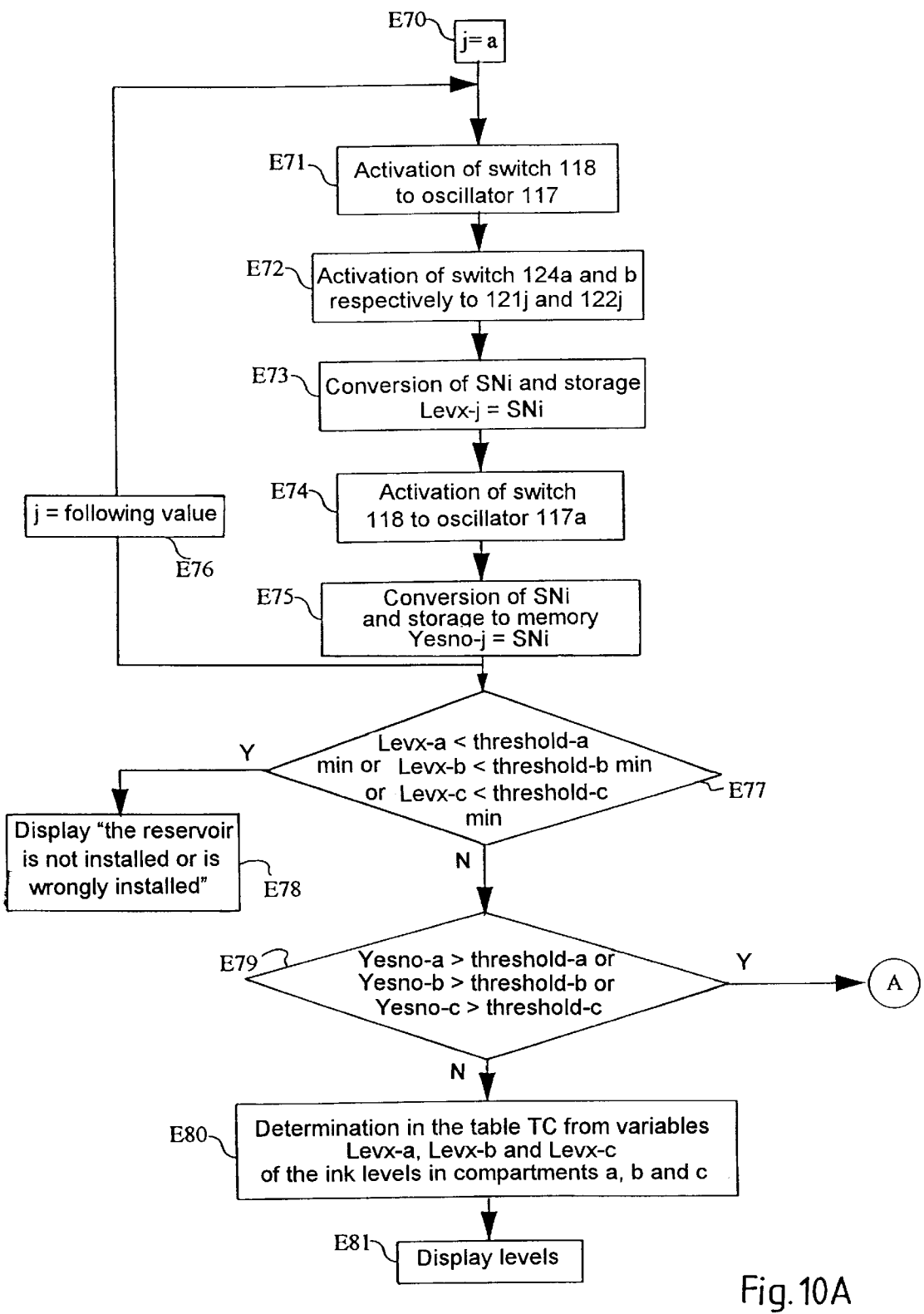
FIG. 10A is a partial flow diagram of the functioning of the monitoring device.
Figure 10:
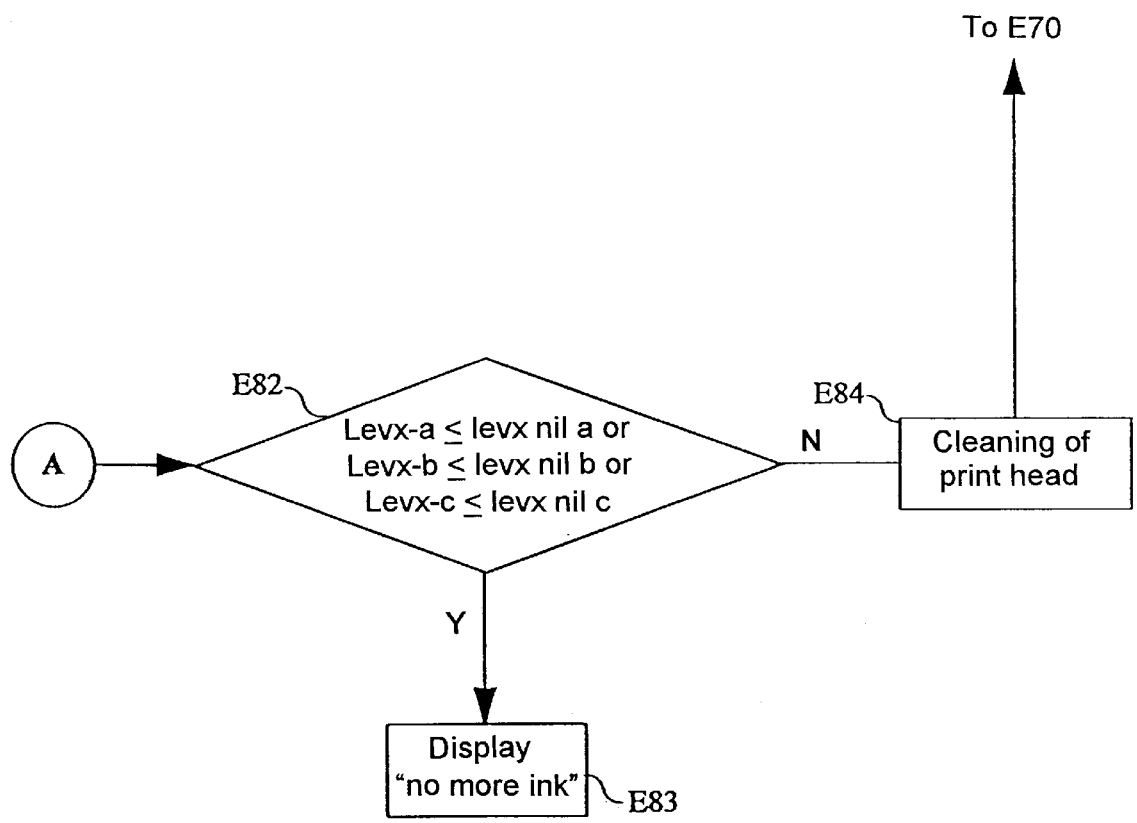
FIG. 10B is the flow diagram connected at A to the flow diagram of FIG. 10A.

An algorithm of the invention is stored in the read only memory 103 of the printing device. As shown diagrammatically in FIGS. 10A and 10B, this algorithm comprises 15 steps E70 to E84 which are run through periodically, for example before the printing of the document or before each page (this can be left to the choice of a user). The algorithm determines the presence of the exchangeable container, the ink level in the different compartments and the need for a cleaning of the print head.

Step E70 consists of initialising the variable j. This variable takes three different values corresponding to the three compartments a, b and c. Each reiteration makes it possible to make the measurements on the compartment a, b or c.

Step E76 enables the variable j to be incremented.

Step E71 consists of positioning the switch 118 for enabling the signal generated by the oscillator 117 to pass to the amplifier 119 and then to the selector 124a.

Step E72 activates the selector 124a and 124b respectively to the metallic plates 121j and 122j. Thus the signal generated by the oscillator 117 supplies the metallic plate 121j, and the measurement can be made on the corresponding metallic plate 122j.

At step E73, the signal Si is converted into an item of digital informal Sni and stored in RAM 109 under the variable levx-j.

Step E74 consists of positioning the switch 118 to the oscillator 117a.

At E75, the new signal Si thus obtained is converted into digital information Sni and stored in RAM 109 under the variable Yesno-j.

These steps E71 to E76 are reiterated until the variable j is equal to c. Thus there are the variables Levx-a, Levx-b, Levx-c and Yesno-a, Yesno-b, Yesno-c stored in RAM 109.

Next, the loop is left and step E77 is reached. At this step, the CPU will verify whether the variables Levx-j are less than the minimum threshold-j. If yes, step E78 is passed to, which displays the fact that the exchangeable container is badly or not installed. If no, the CPU passes to step E79.

This step consists of checking whether the variables Yesno-a, Yesno-b and Yesno-c (representing the presence of ink in the corresponding connecting ducts) are greater than threshold-a, threshold-b and threshold-c (when one of these variables is greater than the threshold, this indicates that there is a lack of ink in the connecting duct). If no, that is to say if the three variables are less than the three thresholds, step E80 is passed to, which consists of determining, in the mapping table (TC), from the variables Levx-a, Levx-b and Levx-c, the ink levels in the compartments a, b and c. Step 81 then consists of displaying the three levels.

If yes, step E82 is passed to. This step consists of checking whether the variables Levx-a, Levx-b and Levx-c are less than or equal to the corresponding levels a, b and c.

In the affirmative, the CPU passes to step E83, which displays the fact that there is no longer any ink in at least one of the compartments.

In the negative, the CPU passes to step E84, which consists of cleaning the print head; once this cleaning has been carried out, there is a return to step E70 in order to recommence the sequence.

It will be appreciated that the invention has the following advantages:

- it makes it possible to detect the need for cleaning the print head;
- it enables the presence or the correct positioning of a cavity or removable compartment of the reservoir to be checked;
- it does not necessitate providing the compartments, so that the invention can be used with existing compartments.

For reasons of clarity, it is worth stating here that, in the present application, the word "reservoir" is used for designating any container (it can have a single cavity or several cavities, or even several subcontainers having one or more cavities), provided with its product outlet channel or channels; it can therefore designate what is sometimes referred to as a "cartridge".

The above description naturally applies to cases where the reservoir has only one cavity.

The invention which has just been described with regard to a printer extends to any office machine having an ink reservoir and at least one print head, as well as to any image forming system using any marking product, whether visible or not, and even to any system using an electrically conductive product designed to be stored in a cavity and having a state (generally liquid, or even viscous) enabling it to flow through an outlet channel.

What is claimed is:

1. A method of monitoring a state of a reservoir made of electrically insulating material containing a product which is normally electrically conductive and having a product storage cavity and a product outlet channel communicating through one end thereof with said storage cavity, comprising:

connecting the other end of the channel to a predetermined potential;

defining a first measurement procedure comprising application of a first electrical signal to said storage cavity and detecting a first measurement signal, said first electrical signal being chosen so that said first measurement signal has a first characteristic varying mainly with the quantity of product contained in said storage cavity, and there is chosen, for said first characteristic, a first range of values corresponding to quantities of product greater than a minimum given quantity of said product;

defining a second measurement procedure comprising application to said storage cavity a second electrical signal different from the first electrical signal and detecting a second measurement signal, said second electrical signal being chosen so that said second measurement signal has a second characteristic varying mainly with the electrical conductivity of the channel between its ends, and there is chosen, for said second characteristic, a second range of values corresponding to conductivities greater than a minimum given electrical conductivity of said channel; and executing at least one monitoring cycle including the following steps:

the first procedure is triggered and a first item of information representing the instantaneous value of the first characteristic is captured;

the second procedure is triggered and a second item of information representing the instantaneous value of the second characteristic is captured;

the first item of information is compared with the first range of values of the first characteristic and the second item of information is compared with the second range of values of the second characteristic; and an abnormality procedure is triggered when the first item of information is within the first range of values and the second item of information is outside the second range of values.

2. A method according to claim 1, wherein the abnormality procedure includes an action consisting of the forced flow of product in the channel.

3. A method according to claim 1 or claim 2, wherein the first electrical signal has a first frequency, the first characteristic is the amplitude of the voltage of the first measurement signal, said first frequency being chosen so that the amplitude of said voltage varies substantially with the quantity of product contained in the storage cavity.

4. A method according to claim 1 or claim 2, wherein the second electrical signal has a second frequency, the second characteristic is the amplitude of the voltage of the second measurement signal, said second frequency being chosen so that the amplitude of said voltage is substantially independent of the quantity of product contained in the storage cavity.

5. A method according to claim 1 or claim 2, wherein the first and second procedures both include applying the first and second electrical signals and detecting the first and second measurement signals in elements which can be separate from the storage cavity, choosing a third range of values, formed by values of the first characteristic corresponding to the presence in said storage cavity of a quantity of product which may be nil, and a triggering second abnormality procedure when the first item of information is outside said third range of values.

6. A method according to claim 5, wherein the second abnormality procedure includes a step of displaying an error message.

7. A method according to claim 1 or claim 2, wherein the reservoir has a plurality of cavities, said first and second ranges of values are established for each storage cavity and a monitoring cycle is executed for each storage cavity.

8. A method according to claim 7, wherein said first electrical signal and said second electrical signal are applied to each cavity.

9. A method according to claim 1 or claim 2, wherein at least one monitoring cycle is repeated a plurality of times during the life of the reservoir.

10. A method according to claim 1 or claim 2, wherein the predetermined potential to which the other end of the channel is connected is the earth potential.

11. A device for monitoring an operational state of a reservoir made of electrically insulating material containing a product which is normally electrically conductive and having at least one storage cavity and a product outlet channel communicating through one end with said storage cavity, comprising:

connection means for connecting the other end of the channel to a predetermined potential;

first means for applying different first and second electrical signals to the storage cavity; p1 second means for detecting first and second measurement signals in response to said first and second electrical signals, said first electrical signal being such that the first measurement signal has a first characteristic varying mainly with the quantity of product contained in the storage cavity, and said second electrical signal being such that the second measurement signal has a second characteristic varying mainly with the electrical conductivity of the channel between its ends;

third means for storing a first range of values which can be taken by the first characteristic for quantities of product greater than a given minimum quantity of said product in the storage cavity, and for storing a second range of values which can be taken by the second characteristic for conductivities greater than a given minimum conductivity of said channel;

processing means for controlling the first, second and third means by triggering a first procedure consisting of applying the first electrical signal and detecting the first measurement signal, and capturing a first item of information representing the instantaneous value of the first characteristic;

triggering a second procedure consisting of applying the second electrical signal and detecting the second measurement signal, and capturing a second item of information representing the instantaneous value of the second characteristic;

comparing the first item of information with the first range of values of the first characteristic and comparing the second item of information with the second range of values of the second characteristic; and triggering an abnormality procedure when the first item of information is inside the first range of values and the second item of information is outside the second range of values.

12. A device according to claim 11, further comprising means for causing a forced flow of product in the channel, controlled by the processing means so as to be activated when the abnormality procedure is triggered.

13. A device according to claim 11 or claim 12, wherein the first means include oscillation means adapted to generate the first and second electrical signals with first and second frequencies, and the second means are designed so as to detect the amplitude of the voltage on the first and second measurement signals, the first and second frequencies being chosen so that the amplitude of the voltage of the first measurement signal varies substantially with the quantity of product contained in the storage cavity; and the amplitude of the voltage of the second measurement signal is substantially independent of the quantity of product contained in the storage cavity.

14. A device according to claim 13, wherein the first means include common elements disposed close to the storage cavity connected by a selector to first and second oscillation means designed to generate respectively the first and second electrical signals.

15. A device according to claim 13, wherein the second means include amplification means, envelope detection means and analog to digital conversion means.

16. A device according to claim 11 or claim 12, wherein the first means include at least a first element to which the first and second electrical signals are applied;

the second means include at least a second element in which the first and second measurement signals are detected, said first and second elements being situated in the immediate vicinity of said storage cavity, with the possibility of having the storage cavity separated therefrom;

the third means contain a third range of values which can be taken by the first characteristic when said storage cavity is present with a quantity of product which may be nil; and the processing means being designed so as to compare the first item of information with said third range of values and to trigger a second abnormality procedure when said first item of information is outside said third range of values.

17. A device according to claim 16, wherein said first element and said second element are integral with a support designed to receive at least one removable storage cavity.

18. A device according to claim 17, wherein the channel is integral with said support.

19. A device according to claim 11 or claim 12, wherein said device also includes display means designed to display messages.

20. A device according to claim 11 or claim 12, wherein the reservoir has at least one other storage cavity containing a different product and one other outlet channel connected to said other storage cavity, and a fourth means include at least one signal application element close to said other storage cavity, a fifth means include at least one signal detection element close to said other storage cavity, a sixth means contains first and second ranges of values for said other storage cavity, and another processing means is designed so as to take off two items of information for said other storage cavity, to compare them with said first and second ranges of values for said other storage cavity, to detect an abnormality situation in consequence, and to trigger another abnormality procedure.

21. A device according to claim 20, wherein the fourth means are designed so as to apply the same first and second electrical signals to each storage cavity as said first means.

22. A device according to claim 21, wherein the sixth means are designed so as to identify the same characteristic in the measurement signals of each storage cavity as said third means.

23. A device according to claim 11 or claim 12, wherein each storage cavity is mounted in a support.

24. A device according to claim 11 or claim 12, wherein the connection means are designed so as to ground said other end of the channel.

25. A signal process device designed to cooperate with a monitoring device having:

a reservoir made of electrically insulating material containing an electrically conductive product and having a storage cavity containing said product and a product outlet channel communicating through one end with said storage cavity;

connection means for connecting the other end of the channel to a predetermined potential;

first means for applying different first and second electrical signals to the storage cavity;

second means for detecting first and second measurement signals in response to said first and second electrical signals, said first electrical signal being such that the first measurement signal has a first characteristic varying mainly with the quantity of product contained in the storage cavity, and said second electrical signal being such that the second measurement signal has a second characteristic varying mainly with the electrical conductivity of the channel between its ends;

third means for storing a first range of values which can be taken by the first characteristic for quantities of product greater than a given minimum quantity of said product in the storage cavity, and for storing a second range of values which can be taken by the second characteristic or conductivities greater than a given minimum conductivity of said channel;

said signal process device having:

means for triggering a first procedure consisting of applying the first electrical signal and detecting the first measurement signal, and for capturing a first item of information representing the instantaneous value of the first characteristic;

means for triggering a second procedure consisting of applying the second electrical signal and detecting the second measurement signal, and for capturing a second item of information representing the instantaneous value of the second characteristic;

means for comparing the first item of information with the first range of values of the first characteristic and for comparing the second item of information with the second range of values of the second characteristic; and means for triggering an abnormality procedure when the first item of information is inside the first range of values and the second item of information is outside the second range of values.

26. A device for supplying an electrically conductive product having a reservoir made of electrically insulating material and formed by a storage cavity containing said product and an outlet channel connected by one end to said storage cavity, a product supply element connected to the other end of the channel, control means connected to said supply element, and a device for monitoring the state of said reservoir in accordance with claim 11 or claim 12.

27. An image forming device having a marking product reservoir and a monitoring device according to claim 11 or claim 12.

28. A printing system including an ink reservoir and a monitoring device according to claim 11 or claim 12.

29. An office machine designed to receive an ink reservoir, having a monitoring device according to claim 11 or claim 12.

30. An office signal processing unit designed to cooperate with an ink reservoir and signal application means and measurement signal detection means, having a signal process device according to claim 25.

* * * * *

UNITED STATES PATENT AND TRADEMARK OFFICE
CERTIFICATE OF CORRECTION

PATENT NO.    : 6,164,744
DATED         : December 26, 2000
INVENTOR(S)   : Marie-Helene Froger et al.

It is certified that error appears in the above-identified patent and that said Letters Patent is hereby corrected as shown below:

Column 5,
Line 47, "12c" should read -- 120c --.

Column 6,
Line 42, "on" should read -- an --.

Column 7,
Line 35, "signal Sni" should read -- signal SNi --.
Line 38, "signal Sni" should read -- signal SNi --.

Column 8,
Line 15, "levx nil-1" should read -- levx nil-i --.
Line 27, "Sw:" should read -- SW: --.
Line 58, "selector 124a" should read -- selectors 124a --.
Line 64, "informal Sni" should read -- signal SNI --.

Column 9,
Line 1, "E75", should read -- step E75, --.
Line 2, "Sni" should read -- SNi --.
Line 21, "81" should read -- E81 --.

Column 10,
Line 11, "cavity" should read -- cavity of --.
Line 22, "cycle" should read -- cycle, --.
Line 62, "a triggering" should read -- triggering a --.

Column 11,
Line 22, "p1 second" should read (in a new paragraph) -- second --.

UNITED STATES PATENT AND TRADEMARK OFFICE
CERTIFICATE OF CORRECTION

PATENT NO. : 6,164,744
DATED : December 26, 2000
INVENTOR(S) : Marie-Helene Froger et al.

It is certified that error appears in the above-identified patent and that said Letters Patent is hereby corrected as shown below:

<u>Column 13,</u>
Line 30, "or" should read -- for --.

Signed and Sealed this

Twenty-sixth Day of February, 2002

*Attest:*

JAMES E. ROGAN
*Attesting Officer*   *Director of the United States Patent and Trademark Office*